United States Patent
Ramirez et al.

(10) Patent No.: US 10,066,147 B2
(45) Date of Patent: Sep. 4, 2018

(54) SELF-DEGRADATION SWELLING DIVERTER SYSTEM

(71) Applicant: Halliburton Energy Services, Inc., Houston, TX (US)

(72) Inventors: Carmen Josefina Ramirez, Ciudad del Carmen (MX); Jan Rene Loaiza, Ciudad del Carmen (MX); Omar Odin Davila, Ciudad del Carmen (MX); Jonnathan Ricardo Tellez, Ciudad del Carmen (MX)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/521,260

(22) PCT Filed: Nov. 25, 2014

(86) PCT No.: PCT/US2014/067233
§ 371 (c)(1),
(2) Date: Apr. 21, 2017

(87) PCT Pub. No.: WO2016/085458
PCT Pub. Date: Jun. 2, 2016

(65) Prior Publication Data
US 2017/0327726 A1    Nov. 16, 2017

(51) Int. Cl.
| | | |
|---|---|---|
| E21B 43/22 | (2006.01) | |
| E21B 33/138 | (2006.01) | |
| C09K 8/508 | (2006.01) | |
| C09K 8/42 | (2006.01) | |
| E21B 21/00 | (2006.01) | |

(52) U.S. Cl.
CPC ............ *C09K 8/5083* (2013.01); *C09K 8/426* (2013.01); *E21B 21/003* (2013.01); *E21B 33/138* (2013.01); *C09K 2208/12* (2013.01)

(58) Field of Classification Search
CPC .......... C09K 8/516; C09K 8/03; C09K 8/032; C09K 8/426; E21B 21/003; E21B 43/267; E21B 33/138; E21B 21/06; E21B 33/134; E21B 33/12
See application file for complete search history.

(56) References Cited

U.S. PATENT DOCUMENTS

| | | |
|---|---|---|
| 6,131,661 A | 10/2000 | Conner et al. |
| 2006/0234871 A1 | 10/2006 | Dalrymple et al. |
| 2008/0217011 A1 | 9/2008 | Pauls et al. |

(Continued)

OTHER PUBLICATIONS

Brink et al., "Qualification and Deployment of a Unique Polymer Conformance-Control System," International Petroleum Technology Conference, Dec. 7-9, 2009, 11 pgs.

(Continued)

*Primary Examiner* — Zakiya W Bates
(74) *Attorney, Agent, or Firm* — McDermott Will & Emery LLP

(57) ABSTRACT

A method including introducing a treatment fluid into a subterranean formation having a downhole temperature in the range of between about 60° C. to about 95° C. The treatment fluid comprises an aqueous fluid, a swelling agent, and an oxidizing agent. Forming a diverter plug at a first permeable zone in the subterranean formation with the swelling agent, and breaking at least a portion of the swelling agent with the oxidizing agent.

20 Claims, 1 Drawing Sheet

(56) References Cited

U.S. PATENT DOCUMENTS

2010/0218949 A1  9/2010  Badalamenti et al.
2014/0069644 A1  3/2014  Reddy et al.

OTHER PUBLICATIONS

International Search Report and Written Opinion for PCT/US2014/067233 dated Jul. 27, 2015.
Abbasy et al., "Laboratory Evaluation of Water-Swellable Materials for Fracture Shutoff," Society of Petroleum Engineers, Apr. 19-23, 2008, 14 pgs.

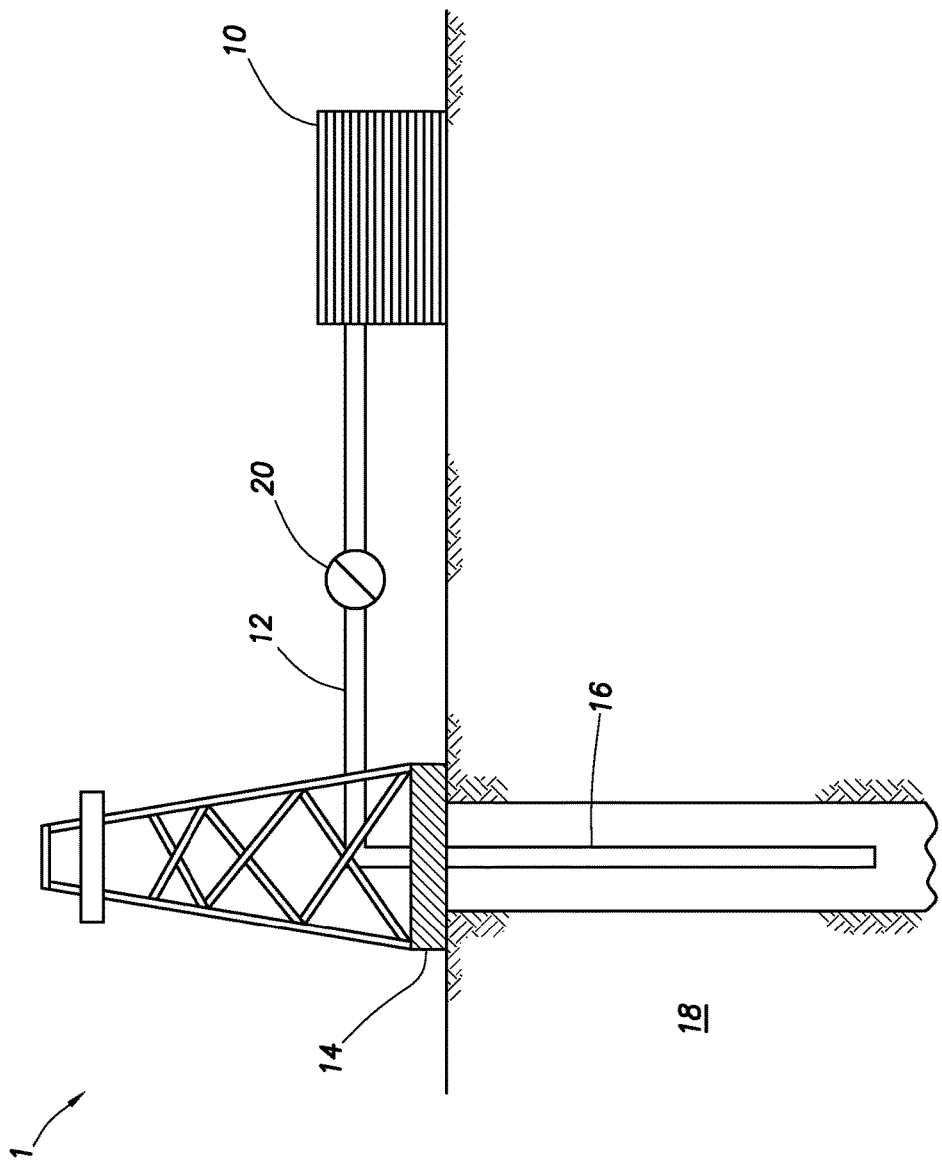

SELF-DEGRADATION SWELLING DIVERTER SYSTEM

BACKGROUND

The present disclosure generally relates to diversion operations in the oil and gas industry and, more specifically, to methods and treatments with self-degradation swelling compositions for diversion operations in subterranean formations.

Treatment fluids can be used in a variety of subterranean operations. Such subterranean operations may include, without limitation, drilling operations, stimulation operations, production operations, remediation operations, sand control treatments, injection operations, and the like. As used herein, the terms "treat," "treatment," "treating," and other grammatical variants thereof refer to any subterranean operation that uses a fluid in conjunction with achieving a desired function and/or for a desired purpose. Use of these terms does not imply any particular action by the treatment fluid or a component thereof unless expressly described as such herein. Illustrative treatment operations can include, for example, fracturing operations, gravel packing operations, acidizing treatments, scale dissolution and removal operations, consolidation operations, diversion operations, and the like.

When performing a subterranean treatment operation, it can sometimes be desirable to temporarily block or divert the flow of a fluid within at least a portion of the subterranean formation by forming a fluid seal therein (e.g., to direct the operation to a particular portion of the subterranean formation). The formation of a diverting fluid seal can itself be considered a treatment operation. Illustrative fluid blocking and diversion operations can include, without limitation, fluid loss control operations, kill operations, conformance control operations, and the like. The fluid that is being blocked or diverted can be a formation fluid that is natively present in the subterranean formation, such as petroleum, gas, or water, or a type of treatment fluid, such as those mentioned above.

Providing effective fluid loss control during subterranean treatment operations can be highly desirable. The term "fluid loss," as used herein, refers to the undesired migration or loss of fluids into a subterranean formation (e.g., from a wellbore penetrating the subterranean formation) and/or a particulate pack (e.g., a particulate pack in a fracture). Fluid loss can be problematic in a number of subterranean operations including, for example, drilling operations, fracturing operations, acidizing operations, gravel-packing operations, workover operations, chemical treatment operations, wellbore clean-out operations, and the like. In fracturing operations, for example, fluid loss into the formation matrix can sometimes result in incomplete fracture propagation and added expense. Formation of a fluid seal in such treatment operations can mitigate the fluid loss.

Likewise, in the reverse of a fluid loss event, incomplete fluid blocking can result in production of an unwanted fluid from a portion of a subterranean formation. For example, incomplete formation of a fluid seal may result in the unwanted incursion of formation water or brine into a wellbore, which may add additional expense and complexity to recovering and purifying the hydrocarbon resources produced therefrom.

Removal of a blocking or diverting substance from a subterranean formation after use may also be desirable once the requisite fluid diversion has been accomplished, for example, to improve the success rate of completion operations, reduce the frequency of necessary remedial operations, reduce formation damage that may impair production rates, reduce problems associated with setting and retrieving downhole tools, reduce operational costs associated with these activities, and the like. Additionally, such removal may be desirable at time periods shortly after the diverting substance has been introduced into a subterranean formation and formed the diverter plug, thereby further reducing operational costs. As used herein, the term "diverter plug" (which may also be referred to as "sealant") refers to a substance that inhibits the flow of a fluid between two locations (e.g., between portions of the wellbore, between two portions of a subterranean formation, between a portion of a wellbore and a portion of a subterranean formation, or between a portion of the wellbore and a portion of the tubular string disposed therein).

BRIEF DESCRIPTION OF THE DRAWINGS

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system for delivering the treatment fluids described herein to a downhole location, according to one or more embodiments.

DETAILED DESCRIPTION

The present disclosure generally relates to diversion operations in the oil and gas industry and, more specifically, to methods and treatments with self-degradation swelling compositions for diversion operations in subterranean formations.

Provided herein are treatment fluids comprising self-degradation swelling compositions that when placed downhole form a diverter plug. The diverter plug may reduce the permeability (a measure of fluid flow connectivity) of the first zone by about 60% or greater (e.g., about 75% or greater, or about 95% or greater). Such permeability reductions may be useful in lowering the influx of a fluid (e.g., water) into the wellbore or prevent loss of a treatment fluid from wellbore into the subterranean formation. In particular, the self-degradation swelling compositions comprise swelling agents that swell in the presence of an aqueous fluid and enter into fractures, vugs, voids, fissures, high-permeability streaks, pore throats, and other permeable zones within a permeable zone in a subterranean formation, thereby forming a diverter plug (e.g., on or in the formation). The self-degradation swelling compositions further comprise an oxidizing agent that is capable of contacting the swelling agents at certain subterranean formation temperatures over a period of time and breaking down the structure of the swelling agent, thereby at least partially reversing the swelling of the swelling agent, allowing it to be removed, as discussed in more detail below. That is, the treatment fluid may be produced at the surface (e.g., out of a wellbore).

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a method comprising preparing a treatment fluid comprising an aqueous fluid and a self-degradation swelling composition comprising a swelling agent and an oxidizing agent, forming a single treatment fluid. The swelling agent has an unswelled diameter and swells upon contact with the aqueous fluid in the treatment fluid. The oxidizing agent breaks at least a portion of the swelling agent upon exposure to temperatures in the range of from a lower limit of about 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., and 78° C. to an upper limit of about 135° C., 134° C., 133° C., 132° C., 131° C., 130° C., 129° C., 128° C., 127° C., 126° C., 125° C., 124° C., 123° C., 122° C., 121° C., 120° C., 119° C., 118° C., 117° C., 116° C., 115° C., 114° C., 113° C., 112° C., 111° C., 110° C., 109° C., 108° C., 107° C., 106° C., 105° C., 104° C., 103° C., 102° C., 101° C., 100° C., 99° C., 98° C., 97° C., 96° C., 95° C., 94° C., 93° C., 92° C., 91° C., 90° C., 89° C., 88° C., 87° C., 86° C., 85° C., 84° C., 83° C., 82° C., 81° C., 80° C., 79° C., and 78° C. (about 80° F. to about 275° F.), encompassing any value and subset therebetween. The treatment fluid (comprising the aqueous fluid and the self-degradation swelling composition) may then be introduced into a subterranean formation having a temperature in the range stated above in which the oxidizing agent breaks at least a portion of the swelling agent, encompassing any value and subset therebetween. The swelled swelling agent may then form a diverter plug in a first permeable zone in the subterranean formation. Thereafter, the oxidizing agent may break at least a portion of the swelling agent, thereby restoring at least a portion of the first permeable zone or otherwise removing at least a portion of the seal produced by the swelling agent thereon or therein.

After a treatment fluid as described herein is placed downhole and a diverter plug is formed in a desired portion of the formation, in some embodiments, another operational fluid, such as one to perform a particular subterranean formation operation (e.g., a fracturing operation) may be introduced into the subterranean formation after the diverter plug is formed using the swelling agent. The diverter plug may divert that operational fluid away from the first permeable zone and to another less permeable zone or other treatment zone of interest. After the diversion, the swelling agent may be broken by the oxidizing agent (e.g., the oxidizing agent may begin breaking the swelling agent even while the diverter plug is in place). In other embodiments, the treatment fluid itself may be reintroduced into the subterranean formation and diverted by the diverter plug to at least a second permeable zone of interest therein, prior to the oxidizing agent at least partially breaking the swelling agent.

Including the self-degradation swelling composition (i.e., both the swelling agent and the oxidizing agent) in the same treatment fluid may permit the swelling agent to swell upon contact with the oxidizing agent, while the oxidizing agent is delayed in breaking down the swelling agent until encountering a particular temperature (e.g., the subterranean temperature), elapse of a period of time, or a combination thereof. Typically, the inclusion of the self-degradation swelling composition in a single treatment fluid will allow the oxidizing agent to break at least a portion of the swelling agent over a shorter period of time after the treatment fluid is introduced into the subterranean formation, rather than if the components of the self-degradation swelling composition were kept separate (e.g., if the oxidizing agent were kept separate from the swelling material until a time after formation of the diverter plug). However, although the oxidizing agent is preferably operable to break the swelling agent at the temperatures provided herein, prolonged exposure between the components of the self-degradation swelling composition (i.e., the swelling agent and the oxidizing agent), such as in storage conditions, may prevent the swelling agent from forming the diverter plug. Generally, the oxidizing agent is capable of at least partially breaking the swelling agent of the self-degradation swelling composition, depending upon a number of factors including the concentration of the swelling agent and the oxidizing agent in the self-degradation swelling composition, the temperature of the subterranean formation, and the like. Typically, the swelling agent in the self-degradation swelling composition swells after the elapse of time in the range of from a lower limit of about 20 minutes ("min"), 21 min, 22 min, 23 min, 24 min, 25 min, 26 min, 27 min, 28 min, 29 min, 30 min, 31 min, 32 min, 33 min, 34 min, 35 min, 36 min, 37 min, 38 min, 39 min, and 40 min to an upper limit of about 60 min, 59 min, 58 min, 57 min, 56 min, 55 min, 54 min, 53 min, 52 min, 51 min, 50 min, 49 min, 48 min, 47 min, 46 min, 45 min, 44 min, 43 min, 42 min, 41 min, and 40 min, encompassing any subset and value therebetween. Typically, the oxidizing agent may break the swelling agent in the self-degradation swelling composition after the elapse of time in the range of from a lower limit of about 30 min, 32 min, 34 min, 36 min, 38 min, 40 min, 42 min, 44 min, 46 min, 48 min, 50 min, 52 min, 54 min, 56 min, 58 min, 60 min, 62 min, 64 min, 66 min, 68 min, 70 min, 72 min, 74 min, and 76 min to an upper limit of about 120 min, 118 min, 116 min, 114 min, 112 min, 110 min, 108 min, 106 min, 104 min, 102 min, 100 min, 98 min, 96 min, 94 min, 92 min, 90 min, 88 min, 86 min, 84 min, 82 min, 80 min, 78 min, and 76 min, encompassing any value and subset therebetween.

In other embodiments, the time for breaking down the swelling agent forming a diverter plug may be preferably delayed by delaying the contact between the swelling agent and the oxidizing agent (e.g., by breaking up the components of the self-degradation swelling composition). For example, in some embodiments, the present disclosure provides a method of preparing a first treatment fluid comprising a first aqueous fluid and a swelling agent, wherein the swelling agent swells upon contact with the first aqueous fluid, and preparing a second treatment fluid comprising a second aqueous fluid and an oxidizing agent, wherein the oxidizing agent breaks at least a portion of the swelling agent at temperatures in the range of from about 60° C. to about 95° C., as discussed previously. The first treatment fluid may be introduced into a subterranean formation having said temperature range, wherein a diverter plug is formed with the swelling agent at a first permeable zone in the subterranean formation. Thereafter, the second treatment fluid may be introduced into the subterranean formation and passed over the diverter plug, thereby contacting the oxidizing agent in the second treatment fluid with the swelling agent forming the diverter plug so as to break at least a portion of the swelling agent and remove a portion of the diverter plug.

The time period between forming the diverter plug and introducing the second treatment fluid may be operationally dependent, taking into account the time that the diverter plug should remain in place to perform the desired operation and the time in which the swelling agent will degrade upon contact with the oxidizing agent, as discussed previously. Additionally, as mentioned in detail with reference to a single treatment fluid comprising both the swelling agent and the oxidizing agent, another operational fluid may be introduced prior to introducing the second treatment fluid, or the first treatment fluid may be introduced so as to form a diverter plug in at least a second permeable zone of interest.

The swelling agent of the present disclosure may be any suitable material that swells upon contact with an aqueous fluid (e.g., water), such as by absorbing the aqueous fluid and expanding. In preferred embodiments, the swelling agent is insoluble in the aqueous fluid and thus avoids becoming diluted and/or washed away by the aqueous fluid or other fluids flowing in the wellbore. In other preferred embodiments, the swelling agent forms a gel mass upon swelling to form the diverter plug described herein. In some embodiments, the gel mass has a relatively low permeability to aqueous fluids and, in some embodiments, also non-aqueous fluids, and thus creates a barrier to the flow of such fluids through a permeable zone in the subterranean formation. As used herein, the term "gel" refers to a crosslinked polymer network swollen in a liquid (e.g., an aqueous fluid).

Suitable swelling agents may include those known as superabsorbents, which are swellable crosslinked polymers particulates, which have the ability to absorb and store many times their own weight of aqueous fluid by forming a gel with one another (e.g., by agglomerating together to form a gel). The superabsorbents retain the liquid that they absorb and typically do not release the liquid, even under pressure. The polymer chains are formed by the reaction/joining of millions of identical units of acrylic acid monomer, which have been substantially neutralized with sodium hydroxide. Crosslinkers tie the chains together to form the three-dimensional network, enabling the superabsorbents to absorb aqueous fluids into the spaces in the molecular network. Examples of suitable superabsorbents may include, but are not limited to, a crosslinked polyacrylate, such as a sodium acrylate-based polymer.

In some embodiments, the swelling agent may be a crystalline polymer, referring to a polymer having regions of three-dimensional ordering on atomic (rather than macromolecular) scale, typically arising from intramolecular folding or stacking of polymer chains. In some embodiments, the crystalline polymer forming the swelling agent is preferably dehydrated and/or hydrophilic. Without being bound by theory, it is believed that the crystalline polymer chains may deflect and surround water molecules in an aqueous fluid to swell (e.g., by absorption). In effect, the polymer undergoes a change from that of a dehydrated crystal to that of a hydrated gel as it swells. Once fully hydrated, the gel preferably exhibits a high resistance to the migration of an aqueous fluid or therethrough. That is, the molecules of the gel are sufficiently packed together to substantially inhibit the aqueous fluid from passing through the gel. Further, the gel can plug permeable zones in a treatment zone in a subterranean formation because it can withstand substantial amounts of pressure without being dislodged or extruded.

Examples of suitable swelling agents for use in the treatment fluids described herein may include, but are not limited to, polyacrylamide, crosslinked polyacrylamide, polyacrylate, crosslinked polyacrylate (e.g., sodium acrylate), hydrolyzed polyacrylonitrile, crosslinked hydrolyzed polyacrylonitrile, carboxylalkyl cellulose, crosslinked carboxylalkyl cellulose, carboxymethyl starch, crosslinked carboxymethyl starch, a salt of carboxymethyl cellulose, a salt of crosslinked carboxymethyl cellulose, carboxyalkyl polysaccharide, crosslinked carboxyalkyl polysaccharide, and combinations thereof. In some embodiments, the swelling agent may preferably be a crosslinked polyacrylamide, which may be in the form of a hard crystal in its unswelled state.

In some embodiments, the swelling agent may have an unswelled particle size in the range of from a lower limit of about 4 mesh, 6 mesh, 8 mesh, 10 mesh, 12 mesh, 14 mesh, 16 mesh, 18 mesh, 20 mesh, 22 mesh, 24 mesh, 26 mesh, 28 mesh, 30 mesh, 32 mesh, 34 mesh, 36 mesh, 38 mesh, 40 mesh, 42 mesh, 44 mesh, 46 mesh, 48 mesh, 50 mesh, and 52 mesh to an upper limit of about 100 mesh, 98 mesh, 96 mesh, 94 mesh, 92 mesh, 90 mesh, 88 mesh, 86 mesh, 84 mesh, 82 mesh, 80 mesh, 78 mesh, 76 mesh, 74 mesh, 72 mesh, 70 mesh, 68 mesh, 66 mesh, 64 mesh, 62 mesh, 60 mesh, 58 mesh, 56 mesh, 54 mesh, and 52 mesh, encompassing any value and subset therebetween. The swelling agent may, in some embodiments, be substantially (i.e., largely but not necessarily wholly) spherical in shape. In other embodiments, the swelling agent may be substantially non-spherical in shape. Suitable non-spherical shapes that the swelling agent of the present disclosure may adopt may include, but are not limited to, cubic-shaped, rectangular-shaped, rod-shaped, ellipse-shaped, cone-shaped, pyramid-shaped, cylinder-shaped, and any combination thereof. That is, in embodiments wherein the swelling agents are substantially non-spherical, the aspect ratio of the material may range such that the material is fibrous to such that it is cubic, octagonal, or any other configuration. The size and shape of the swelling agents may depend on a number of factors including, but not limited to, the type of subterranean formation operation being performed, the type and size of the permeable regions in the subterranean formation of interest, the type of swelling agent selected, and the like.

In some embodiments, the swelling agent may be present in the treatment fluid (including the first treatment fluid) in an amount in the range of from a lower limit of about 100 pounds per 1000 gallons ("lb/Mgal"), 110 lb/Mgal, 120 lb/Mgal, 130 lb/Mgal, 140 lb/Mgal, 150 lb/Mgal, 160 lb/Mgal, 170 lb/Mgal, 180 lb/Mgal, 190 lb/Mgal, 200 lb/Mgal, 210 lb/Mgal, 220 lb/Mgal, 230 lb/Mgal, 240 lb/Mgal, and 250 lb/Mgal to an upper limit of about 400 lb/Mgal, 390 lb/Mgal, 380 lb/Mgal, 370 lb/Mgal, 360 lb/Mgal, 350 lb/Mgal, 340 lb/Mgal, 330 lb/Mgal, 320 lb/Mgal, 310 lb/Mgal, 300 lb/Mgal, 290 lb/Mgal, 280 lb/Mgal, 270 lb/Mgal, 260 lb/Mgal, and 250 lb/Mgal, encompassing any value and subset therebetween.

The oxidizing agent of the present disclosure may be any oxidizing agent capable of breaking at least a portion of the swelling agent, whether included in a single treatment fluid with the swelling agent or in a second treatment fluid that passes over the diverter plug formed by the swelling agent introduced in a first treatment fluid. No particular mechanism is necessarily implied by the term "breaking," but may include breaking down or collapsing the polymer structure of the swelling agent such as by, for example, breaking the polymer backbone bonds, breaking crosslinks in the polymer, cutting polymer chains, and the like. The oxidizing agent described herein may be used to remove a diverter plug formed by a swelling agent after the diverter plug has been used for its intended purpose. In some embodiments, the oxidizing agent may remove the diverter plug by breaking the backbone of the polymer structure of the swelling agent forming the diverter plug, such that the swelling agent converts into a liquid phase, or at least partially into a liquid phase. Thereafter, the broken swelling agent may be removed from the subterranean formation, such as by introducing a fluid that carries the broken swelling agent back to the surface.

Suitable oxidizing agents may include, but are not limited to, a persulfate, a peroxide, a perborate, a chlorine oxyacid, a bromine oxyacid, an iodine oxyacid, a chlorine oxyanion, a bromine oxyanion, an iodine oxyanion, and any combination thereof. Examples of suitable persulfates may include, but are not limited to, sodium persulfate, ammonium persulfate, potassium persulfate, and any combination thereof. Examples of suitable peroxides may include, but are not limited to, sodium peroxide, calcium peroxide, zinc peroxide, and any combination thereof. Examples of suitable perborates may include, but are not limited to, sodium perborate, potassium perborate, sodium peroxyborate tetrahydrate, sodium peroxyborate monohydrate, and any combination thereof.

Examples of suitable chlorine oxyacids may include, but are not limited to, hypochlorous acid, chlorous acid, chloric acid, perchloric acid, and any combination thereof. Examples of suitable bromine oxyacids may include, but are not limited to, perbromic acid, bromic acid, bromous acid, hypobromous acid, and any combination thereof. Examples of suitable iodine oxyacids may include, but are not limited to, periodic acid, orthoperiodic acid, iodic acid, hypoiodous acid, and any combination thereof. Examples of suitable chlorine oxyanions may include, but are not limited to, perchlorate (e.g., ammonium perchlorate, sodium perchlorate, potassium perchlorate, and the like), chlorate (e.g., potassium chlorate, sodium chlorate, magnesium chlorate, and the like), chlorite (e.g., sodium chlorite, magnesium chlorite, and the like), hypochlorite (e.g., sodium hypochlorite, calcium hypochlorite, lithium hypochlorite, barium hypochlorite, and the like), and any combination thereof. Examples of suitable bromine oxyanions may include, but are not limited to, perbromate (e.g., sodium perbromate), bromate (e.g., sodium bromate, potassium bromate, and the like), bromite (e.g., sodium bromite), hypobromite, and any combination thereof. Examples of suitable iodine oxyanions may include, but are not limited to, periodate (e.g., sodium periodate, potassium periodate, and the like), iodate (e.g., sodium iodate, silver iodate, calcium iodate, potassium iodate, and the like), hypoiodite, and any combination thereof.

Examples of suitable commercially available oxidizing agents may include VICON NF™, a chlorine oxyanion (i.e., a salt of chlorous acid), SP BREAKER, a sodium persulfate, and OXOL II™, a sodium perborate, each available from Halliburton Energy Services, Inc. in Houston, Tex.

In some embodiments, the oxidizing agent may be present in the treatment fluids (including the second treatment fluids) of the present disclosure in an amount ranging from a lower limit of about 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, and 6% to an upper limit of about 10%, 9.9%, 9.8%, 9.7%, 9.6%, 9.5%, 9.4%, 9.3%, 9.2%, 9.1%, 9%, 8.9%, 8.8%, 8.7%, 8.6%, 8.5%, 8.4%, 8.3%, 8.2%, 8.1%, 8%, 7.9%, 7.8%, 7.7%, 7.6%, 7.5%, 7.4%, 7.3%, 7.2%, 7.1%, 7%, 6.9%, 6.8%, 6.7%, 6.6%, 6.5%, 6.4%, 6.3%, 6.2%, 6.1%, and 6% by volume of the treatment fluid, encompassing any value and subset therebetween.

In some embodiments, where the swelling agent and the oxidizing agent are in a single treatment fluid, the swelling agent may be present in an amount of about 200 lb/Mgal of the treatment fluid and the oxidizing agent may be present in an amount of about 2.4% by volume of the treatment fluid, or the swelling agent may be present in an amount of about 200 lb/Mgal of the treatment fluid and the oxidizing agent may be present in an amount of about 5% by volume of the treatment fluid. In other embodiments, the swelling agent may be present in an amount of about 100 lb/Mgal of the treatment fluid and the oxidizing agent may be present in an amount of about 2.4% by volume of the treatment fluid, or the swelling agent may be present in an amount of about 100 lb/Mgal of the treatment fluid and the oxidizing agent may be present in an amount of about 5% by volume of the treatment fluid. In yet other embodiments, the swelling agent may be present in an amount of about 400 lb/Mgal of the treatment fluid and the oxidizing agent may be present in an amount of about 2.4% by volume of the treatment fluid, or the swelling agent may be present in an amount of about 400 lb/Mgal of the treatment fluid and the oxidizing agent may be present in an amount of about 5% by volume of the treatment fluid.

In those embodiments where the swelling agent is in a first treatment fluid and the oxidizing agent is in a second treatment fluid, the swelling agent may be present in an amount of about 200 lb/Mgal of the first treatment fluid and the oxidizing agent may be present in an amount of about 2.4% by volume of the second treatment fluid, or the swelling agent may be present in an amount of about 200 lb/Mgal of the first treatment fluid and the oxidizing agent may be present in an amount of about 5% by volume of the second treatment fluid. In other embodiments, the swelling agent may be present in an amount of about 100 lb/Mgal of the first treatment fluid and the oxidizing agent may be present in an amount of about 2.4% by volume of the second treatment fluid, or the swelling agent may be present in an amount of about 100 lb/Mgal of the first treatment fluid and the oxidizing agent may be present in an amount of about 5% by volume of the second treatment fluid. In yet other embodiments, the swelling agent may be present in an amount of about 400 lb/Mgal of the first treatment fluid and the oxidizing agent may be present in an amount of about 2.4% by volume of the second treatment fluid, or the swelling agent may be present in an amount of about 400 lb/Mgal of the first treatment fluid and the oxidizing agent may be present in an amount of about 5% by volume of the second treatment fluid.

The aqueous fluid for forming the treatment fluids (including the first and second treatment fluids) may be any aqueous fluid suitable for use in a subterranean formation that does not adversely interfere with the operation of the swelling agents or the oxidizing agents described herein. Suitable aqueous fluids may include, but are not limited to, fresh water, saltwater (e.g., water containing one or more salts dissolved therein), brine (e.g., saturated salt water), seawater, produced water, and any combination thereof. In some embodiments, the aqueous fluid may be recycled water previously used in a treatment fluid (either of the type described herein or of another type), which may, in some cases, have various components removed prior to their use in the methods described herein. In some embodiments, the pH of the aqueous fluid may be adjusted to, among other purposes, ensure that the swelling agents and oxidizing agents optimally perform. For example, in some embodiments, the pH of the aqueous fluid comprising either the whole self-degradation swelling composition or a portion thereof may be between about pH 7 to about pH 7.5, encompassing any value and subset therebetween.

In some embodiments, the treatment fluids (including the first and second treatment fluids) may further comprise an additive selected from the group consisting of a salt, an inert solid, a gelling agent, a particulate, a gravel particulate, a lost circulation material, a pH control additive, a breaker, a biocide, a bactericide, and any combination thereof.

In various embodiments, systems configured for delivering the treatment fluids (i.e., the temporary sealant slurry and the fracturing fluid) described herein to a downhole location are described. In various embodiments, the systems can comprise a pump fluidly coupled to a tubular, the tubular containing the treatment fluids described herein. It will be appreciated that, while the system described below may be used for delivering either or both of the temporary sealant slurry and the fracturing fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluids may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that, while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components may be included in the systems generally described above and depicted in FIG. 1.

Embodiments disclosed herein include:

Embodiment A

A method comprising: providing a treatment fluid comprising an aqueous fluid, a swelling agent, and an oxidizing agent, wherein the swelling agent has an unswelled size of about 4 mesh to about 100 mesh and is present in an amount in the range of from about 100 to about 400 lb/Mgal of the treatment fluid, wherein the oxidizing agent is present in an amount in the range of from about 2% to about 10% by volume of the treatment fluid, and wherein the oxidizing agent breaks at least a portion of the swelling agent upon exposure to temperatures in the range of between about 60° C. to about 95° C.; introducing the treatment fluid into a subterranean formation having a downhole temperature in the range of between about 60° C. to about 95° C.; forming a diverter plug at a first permeable zone in the subterranean formation with the swelling agent; and breaking at least a portion of the swelling agent with the oxidizing agent.

Element A may have one or more of the following additional elements in any combination:

Element A1: Wherein the swelling agent is a crystalline polymer.

Element A2: Wherein the swelling agent is selected from the group consisting of polyacrylamide, crosslinked polyacrylamide, polyacrylate, crosslinked polyacrylate, hydrolyzed polyacrylonitrile, crosslinked hydrolyzed polyacrylonitrile, carboxylalkyl cellulose, crosslinked carboxylalkyl cellulose, carboxymethyl starch, crosslinked carboxymethyl starch, a salt of carboxymethyl cellulose, a salt of crosslinked carboxymethyl cellulose, carboxyalkyl polysaccharide, crosslinked carboxyalkyl polysaccharide, and combinations thereof.

Element A3: Wherein the oxidizing agent is selected from the group consisting of a persulfate, a peroxide, a perborate, a chlorine oxyacid, a bromine oxyacid, an iodine oxyacid, a chlorine oxyanion, a bromine oxyanion, an iodine oxyanion, and any combination thereof.

Element A4: Wherein the swelling agent is present in an amount of about 200 lb/Mgal of the treatment fluid and the oxidizing agent is present in an amount of about 2.4% by volume of the treatment fluid.

Element A5: Wherein the swelling agent is present in an amount of about 200 lb/Mgal of the treatment fluid, and the oxidizing agent is present in an amount of about 5% by volume of the treatment fluid.

Element A6: Wherein the swelling agent is present in an amount of about 100 lb/Mgal of the treatment fluid, and the oxidizing agent is present in an amount of about 2.4% by volume of the treatment fluid.

Element A7: Wherein the swelling agent is present in an amount of about 100 lb/Mgal of the treatment fluid, and the oxidizing agent is present in an amount of about 5% by volume of the treatment fluid.

Element A8: Wherein the swelling agent is present in an amount of about 400 lb/Mgal of the treatment fluid, and the oxidizing agent is present in an amount of about 2.4% by volume of the treatment fluid.

Element A9: Wherein the swelling agent is present in an amount of about 400 lb/Mgal of the treatment fluid, and the oxidizing agent is present in an amount of about 5% by volume of the treatment fluid.

By way of non-limiting example, exemplary combinations applicable to A include: A with A1 and A4; A with A1 and A5; A with A1 and A6; A with A1 and A7; A with A1 and A8; A with A1 and A9; A with A2 and A4; A with A2 and A5; A with A2 and A6; A with A2 and A7; A with A2 and A8; A with A2 and A9; A with A3 and A4; A with A3 and A5; A with A3 and A6; A with A3 and A7; A with A3 and A8; A with A3 and A9; A with A1 and A2; A with A1 and A3; A with A2 and A3; A with A1, A2, and A3.

Embodiment B

A method comprising: providing a first treatment fluid comprising a first aqueous fluid and a swelling agent, wherein the swelling agent has an unswelled size of about 4 mesh to about 100 mesh and is present in an amount in the range of from about 100 to about 400 lb/Mgal of the treatment fluid; providing a second treatment fluid comprising a second aqueous fluid and an oxidizing agent, wherein the oxidizing agent is present in an amount in the range of from about 2% to about 10% by volume of the second treatment fluid, and wherein the oxidizing agent breaks at least a portion of the swelling agent upon contact with the swelling agent at temperatures in the range of between about 60° C. to about 95° C.; introducing the first treatment fluid into a subterranean formation having a downhole temperature in the range of between about 60° C. to about 95° C.; forming a diverter plug at a first permeable zone in the subterranean formation with the swelling agent; introducing the second treatment fluid into the subterranean formation and passing the second treatment fluid over the diverter plug, thereby contacting the oxidizing agent with the swelling agent; and breaking at least a portion of the swelling agent with the oxidizing agent.

Element B may have one or more of the following additional elements in any combination:

Element B1: Wherein the swelling agent is a crystalline polymer.

Element B2: Wherein the swelling agent is selected from the group consisting of polyacrylamide, crosslinked polyacrylamide, polyacrylate, crosslinked polyacrylate, hydrolyzed polyacrylonitrile, crosslinked hydrolyzed polyacrylonitrile, carboxylalkyl cellulose, crosslinked carboxylalkyl cellulose, carboxymethyl starch, crosslinked carboxymethyl starch, a salt of carboxymethyl cellulose, a salt of crosslinked carboxymethyl cellulose, carboxyalkyl polysaccharide, crosslinked carboxyalkyl polysaccharide, and combinations thereof.

Element B3: Wherein the oxidizing agent is selected from the group consisting of a persulfate, a peroxide, a perborate, a chlorine oxyacid, a bromine oxyacid, an iodine oxyacid, a chlorine oxyanion, a bromine oxyanion, an iodine oxyanion, and any combination thereof.

Element B4: Wherein the swelling agent is present in an amount of about 200 lb/Mgal of the first treatment fluid, and the oxidizing agent is present in an amount of about 2.4% of the second treatment fluid.

Element B5: Wherein the swelling agent is present in an amount of about 200 lb/Mgal of the first treatment fluid, and the oxidizing agent is present in an amount of about 5% of the second treatment fluid.

Element B6: Wherein the swelling agent is present in an amount of about 100 lb/Mgal of the first treatment fluid, and the oxidizing agent is present in an amount of about 2.4% of the second treatment fluid.

Element B7: Wherein the swelling agent is present in an amount of about 100 lb/Mgal of the first treatment fluid, and the oxidizing agent is present in an amount of about 5% of the second treatment fluid.

Element B8: Wherein the swelling agent is present in an amount of about 400 lb/Mgal of the first treatment fluid, and the oxidizing agent is present in an amount of about 2.4% of the second treatment fluid.

Element B9: Wherein the swelling agent is present in an amount of about 400 lb/Mgal of the first treatment fluid, and the oxidizing agent is present in an amount of about 5% of the second treatment fluid.

By way of non-limiting example, exemplary combinations applicable to B include: B with B1 and B4; B with B1 and B5; B with B1 and B6; B with B1 and B7; B with B1 and B8; B with B1 and B9; B with B2 and B4; B with B2 and B5; B with B2 and B6; B with B2 and B7; B with B2 and B8; B with B2 and B9; B with B3 and B4; B with B3 and B5; B with B3 and B6; B with B3 and B7; B with B3 and B8; B with B3 and B9; B with B1 and B2; B with B1 and B3; B with B2 and B3; B with B1, B2, and B3.

To facilitate a better understanding of the embodiments of the present invention, the following examples of preferred or representative embodiments are given. In no way should the following examples be read to limit, or to define, the scope of the invention.

Example 1

In this example, the ability of OXOL II™ (a sodium perborate oxidizing agent) to break at least a portion of a crosslinked polyacrylamide swelling agent, as described herein, was evaluated. A first treatment fluid comprising 100 lb/Mgal of about a <5 mesh crosslinked polyacrylamide swelling agent, 2.4% of OXOL II™, and fresh water was prepared. A second treatment fluid comprising 100 lb/Mgal of a 5 mesh crosslinked polyacrylamide swelling agent, 2.4% of OXOL II™, and fresh water was prepared. Each of the first and second treatment fluids were placed in a jar and stirred vigorously for 30-40 min. Thereafter, the jars were placed in a water bath at 80° C. for 60 minutes, then filtered through a 100 mesh filter, and visually observed. Both the first and second treatment fluids appeared prior to filtering as a more liquid substance after the 60 minutes in the water bath. After filtering, less than about half of the initial concentration of the swelling agent appeared to be maintained on the filter, indicating good breaking of both sizes of the swelling agent by the OXOL II™ at the concentrations in each treatment fluid.

Example 2

In this example, the ability of VICON NF™ (a chlorine oxyanion oxidizing agent) to break at least a portion of a crosslinked polyacrylamide swelling agent, as described herein, was evaluated. A first treatment fluid comprising 200 lb/Mgal of about a <5 mesh crosslinked polyacrylamide swelling agent, 2.4% of VICON NF™, and fresh water was prepared. A second treatment fluids comprising 200 lb/Mgal of a 5 mesh crosslinked polyacrylamide swelling agent, 2.4% of VICON NF™, and fresh water was prepared. Each of the first and second treatment fluids were placed in a jar and stirred vigorously for 30-40 min. Thereafter, the jars were placed in a water bath at 80° C. for 60 minutes, then filtered through a 100 mesh filter, and visually observed. Both the first and second treatment fluids appeared prior to filtering as a more liquid substance after the 60 minutes in the water bath; however, the second treatment fluid turned from a clear translucent color to a brown translucent color. After filtering, less than about half of the initial concentration of the swelling agent appeared to be, indicating good breaking of both sizes of the swelling agent by the VICON NF™ at the concentrations in each treatment fluid.

Example 3

In this example, the ability of SP BREAKER (a sodium persulfate oxidizing agent) to break at least a portion of a crosslinked polyacrylamide swelling agent, as described herein, was evaluated. A first treatment fluid comprising 200 lb/Mgal of about a <5 mesh crosslinked polyacrylamide swelling agent, 2.4% of SP BREAKER, and fresh water was prepared. A second treatment fluid comprising 200 lb/Mgal of a 5 mesh crosslinked polyacrylamide swelling agent, 2.4% of SP BREAKER, and fresh water was prepared. Each of the first and second treatment fluids were placed in a jar and stirred vigorously for 30 min. Thereafter, the jars were placed in a water bath at 80° C. for 60 minutes, then filtered through a 100 mesh filter, and visually observed. Both the first and second treatment fluids appeared prior to filtering as a more liquid substance after the 60 minutes in the water bath. After filtering, an amount of precipitate less than the initial swelling agent concentration was observed in both treatment fluids, but by appearances only about 25% less, indicating that SP BREAKER was able to break a portion of the swelling agents but was less effective at the given concentration than OXOL II™ and VICON NF™. Additionally, the interaction between the swelling agent and the oxidizing agent in both the first and second treatment fluids caused the swelling agent to react and turn yellow in color, as observed after filtering.

Example 4

In this example, the ability of both VICON NF™ and OXOL II™ to break a crosslinked polyacrylamide swelling agent was quantified. Eight treatment fluids were prepared according to Table 1. Each treatment fluid was placed in a jar and stirred vigorously for 30-40 min. Thereafter, the jars were placed in a water bath at 90° C. for 60 minutes, then filtered through a 100 mesh filter. The amount of broken swelling agent was quantified by comparing the weight of the swelling agent initially included in the treatment fluid to the weight of the swelling agent maintained on the filter. The results are shown in Table 1. As indicated, at each concentration of swelling agent and oxidizing agent, the oxidizing agent worked to break a greater percentage of the larger swelling agent as compared to the finer sized swelling agent. Additionally, increased volume of the swelling agent demonstrated greater or equal breaking for each concentration of the oxidizing agent. Universally, OXOL II™ showed greater breaking capacity and efficiency compared to VICON NF™.

TABLE 1

| | Swelling Agent | | Oxidizing Agent | | |
|---|---|---|---|---|---|
| No | Size | Concentration | Type | Concentration | % Broken |
| 1 | 5 mesh | 200 lb/Mgal in 50 mL | OXOL II ™ | 2.4% | 67.46 |
| 2 | 5 mesh | 200 lb/Mgal in 50 mL | VICON NF ™ | 5% | 57.56 |
| 3 | <5 mesh | 200 lb/Mgal in 50 mL | OXOL II ™ | 2.4% | 78.72 |
| 4 | <5 mesh | 200 lb/Mgal in 50 mL | VICON NF ™ | 5% | 34.34 |
| 5 | 5 mesh | 200 lb/Mgal in 100 mL | OXOL II ™ | 2.4% | 79.04 |
| 6 | 5 mesh | 200 lb/Mgal in 100 mL | VICON NF ™ | 5% | 56.79 |
| 7 | <5 mesh | 200 lb/Mgal in 100 mL | OXOL II ™ | 2.4% | 99.73 |
| 8 | <5 mesh | 200 lb/Mgal in 100 mL | VICON NF ™ | 5% | 46.15 |

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design shown herein, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A and B" or "at least one of A or B" each refer to only A, only B, or only C; any combination of A, B, and C; and/or at least one of each of A, B, and C.

The invention claimed is:
1. A method comprising:
providing a treatment fluid comprising an aqueous fluid, a swelling agent, and an oxidizing agent,
wherein the swelling agent has an unswelled size of about 4 mesh to about 100 mesh and is present in an amount in the range of from about 100 to about 400 lb/Mgal of the treatment fluid,
wherein the oxidizing agent is present in an amount in the range of from about 2% to about 10% by volume of the treatment fluid, and
wherein the oxidizing agent breaks at least a portion of the swelling agent upon exposure to temperatures in the range of between about 60° C. to about 95° C.;
introducing the treatment fluid into a subterranean formation having a downhole temperature in the range of between about 60° C. to about 95° C.;
forming a diverter plug at a first permeable zone in the subterranean formation with the swelling agent; and
breaking at least a portion of the swelling agent with the oxidizing agent,
wherein the swelling agent is a polymer, and
wherein the oxidizing agent breaks a backbone of the polymer of the swelling agent.
2. The method of claim 1, wherein the swelling agent is a crystalline polymer.
3. The method of claim 1, wherein the swelling agent is selected from the group consisting of polyacrylamide, crosslinked polyacrylamide, polyacrylate, crosslinked polyacrylate, hydrolyzed polyacrylonitrile, crosslinked hydrolyzed polyacrylonitrile, carboxylalkyl cellulose, crosslinked carboxylalkyl cellulose, carboxymethyl starch, crosslinked carboxymethyl starch, a salt of carboxymethyl cellulose, a salt of crosslinked carboxymethyl cellulose, carboxyalkyl polysaccharide, crosslinked carboxyalkyl polysaccharide, and combinations thereof.
4. The method of claim 1, wherein the oxidizing agent is selected from the group consisting of a persulfate, a peroxide, a perborate, a chlorine oxyacid, a bromine oxyacid, an iodine oxyacid, a chlorine oxyanion, a bromine oxyanion, an iodine oxyanion, and any combination thereof.
5. The method of claim 1, wherein the swelling agent is present in an amount of about 200 lb/Mgal of the treatment fluid and the oxidizing agent is present in an amount of about 2.4% by volume of the treatment fluid.
6. The method of claim 1, wherein the swelling agent is present in an amount of about 200 lb/Mgal of the treatment fluid, and the oxidizing agent is present in an amount of about 5% by volume of the treatment fluid.
7. The method of claim 1, wherein the swelling agent is present in an amount of about 100 lb/Mgal of the treatment fluid, and the oxidizing agent is present in an amount of about 2.4% by volume of the treatment fluid.
8. The method of claim 1, wherein the swelling agent is present in an amount of about 100 lb/Mgal of the treatment fluid, and the oxidizing agent is present in an amount of about 5% by volume of the treatment fluid.

9. The method of claim 1, wherein the swelling agent is present in an amount of about 400 lb/Mgal of the treatment fluid, and the oxidizing agent is present in an amount of about 2.4% by volume of the treatment fluid.

10. The method of claim 1, wherein the swelling agent is present in an amount of about 400 lb/Mgal of the treatment fluid, and the oxidizing agent is present in an amount of about 5% by volume of the treatment fluid.

11. A method comprising:
providing a first treatment fluid comprising a first aqueous fluid and a swelling agent,
wherein the swelling agent has an unswelled size of about 4 mesh to about 100 mesh and is present in an amount in the range of from about 100 to about 400 lb/Mgal of the treatment fluid;
providing a second treatment fluid comprising a second aqueous fluid and an oxidizing agent,
wherein the oxidizing agent is present in an amount in the range of from about 2% to about 10% by volume of the second treatment fluid, and
wherein the oxidizing agent breaks at least a portion of the swelling agent upon contact with the swelling agent at temperatures in the range of between about 60° C. to about 95° C.;
introducing the first treatment fluid into a subterranean formation having a downhole temperature in the range of between about 60° C. to about 95° C.;
forming a diverter plug at a first permeable zone in the subterranean formation with the swelling agent;
introducing the second treatment fluid into the subterranean formation and passing the second treatment fluid over the diverter plug, thereby contacting the oxidizing agent with the swelling agent; and
breaking at least a portion of the swelling agent with the oxidizing agent,
wherein the swelling agent is a polymer, and
wherein the oxidizing agent breaks a backbone of the polymer of the swelling agent.

12. The method of claim 11, wherein the swelling agent is a crystalline polymer.

13. The method of claim 11, wherein the swelling agent is selected from the group consisting of polyacrylamide, crosslinked polyacrylamide, polyacrylate, crosslinked polyacrylate, hydrolyzed polyacrylonitrile, crosslinked hydrolyzed polyacrylonitrile, carboxylalkyl cellulose, crosslinked carboxylalkyl cellulose, carboxymethyl starch, crosslinked carboxymethyl starch, a salt of carboxymethyl cellulose, a salt of crosslinked carboxymethyl cellulose, carboxyalkyl polysaccharide, crosslinked carboxyalkyl polysaccharide, and combinations thereof.

14. The method of claim 11, wherein the oxidizing agent is selected from the group consisting of a persulfate, a peroxide, a perborate, a chlorine oxyacid, a bromine oxyacid, an iodine oxyacid, a chlorine oxyanion, a bromine oxyanion, an iodine oxyanion, and any combination thereof.

15. The method of claim 11, wherein the swelling agent is present in an amount of about 200 lb/Mgal of the first treatment fluid, and the oxidizing agent is present in an amount of about 2.4% of the second treatment fluid.

16. The method of claim 11, wherein the swelling agent is present in an amount of about 200 lb/Mgal of the first treatment fluid, and the oxidizing agent is present in an amount of about 5% of the second treatment fluid.

17. The method of claim 11, wherein the swelling agent is present in an amount of about 100 lb/Mgal of the first treatment fluid, and the oxidizing agent is present in an amount of about 2.4% of the second treatment fluid.

18. The method of claim 11, wherein the swelling agent is present in an amount of about 100 lb/Mgal of the first treatment fluid, and the oxidizing agent is present in an amount of about 5% of the second treatment fluid.

19. The method of claim 11, wherein the swelling agent is present in an amount of about 400 lb/Mgal of the first treatment fluid, and the oxidizing agent is present in an amount of about 2.4% of the second treatment fluid.

20. The method of claim 11, wherein the swelling agent is present in an amount of about 400 lb/Mgal of the first treatment fluid, and the oxidizing agent is present in an amount of about 5% of the second treatment fluid.

* * * * *